United States Patent [19]

Batik

[11] 4,182,445

[45] Jan. 8, 1980

[54] APPARATUS FOR TRANSPORTING BULK MATERIALS

[75] Inventor: Franz Batik, Perchtoldsdorf, Austria

[73] Assignee: Wiener Bruckenbau-und Eisenkonstruktions-Aktiengesellschaft, Austria

[21] Appl. No.: 919,353

[22] Filed: Jun. 26, 1978

[30] Foreign Application Priority Data

Jul. 19, 1977 [AT] Austria .................................. 5195/77

[51] Int. Cl.$^2$ .......................................... B65G 17/36
[52] U.S. Cl. ................................................... 198/703
[58] Field of Search ............................... 198/703, 483

[56] References Cited

U.S. PATENT DOCUMENTS

196348  10/1877  Gallaher .............................. 198/703

*Primary Examiner*—Robert B. Reeves
*Assistant Examiner*—Brian M. Bond
*Attorney, Agent, or Firm*—Sprung, Felfe, Horn, Lynch & Kramer

[57] ABSTRACT

The invention provides a bucket-conveyor device suitable for emptying bulk materials from a ship's hold, comprising an endless chain conveyor having buckets fixed to spaced links which are emptied as the buckets pass over an upper return pulley. In order to control the direction of emptying of the buckets and thereby minimize spillage of the bulk material, discharge chutes are pivotally articulated to the upper return pulley at intervals corresponding to the spacing of the buckets.

8 Claims, 9 Drawing Figures

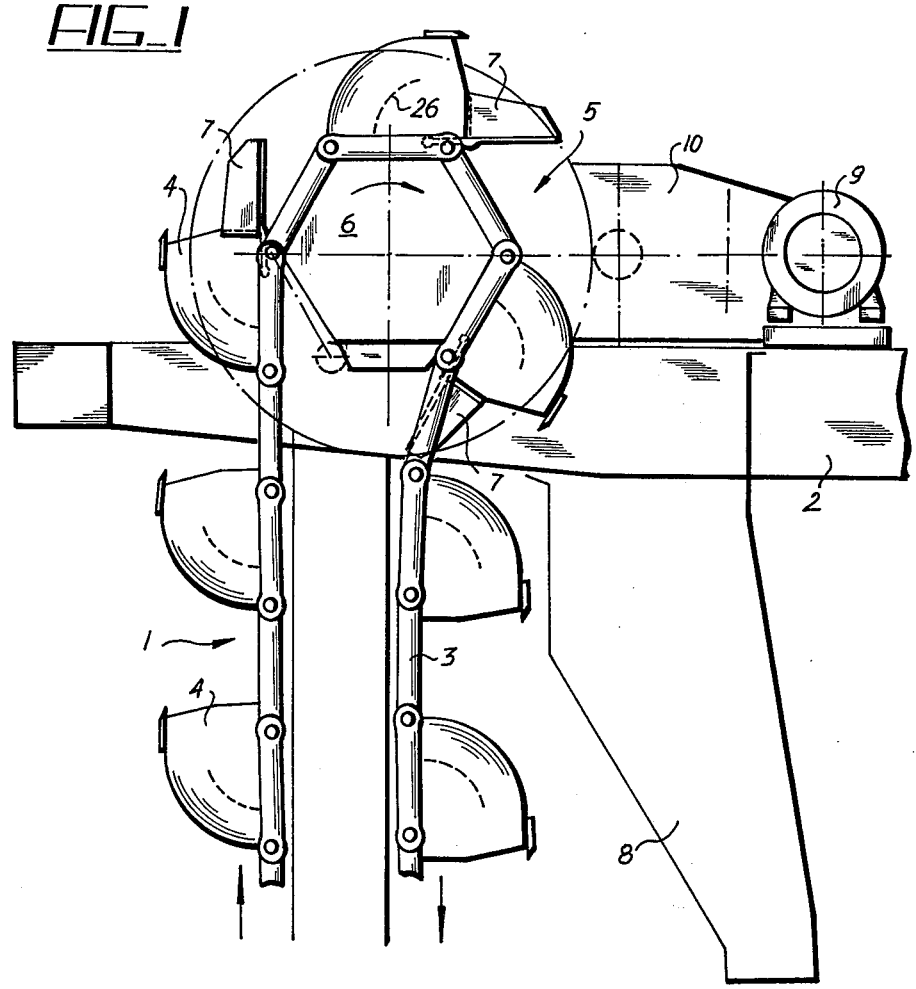
FIG_1
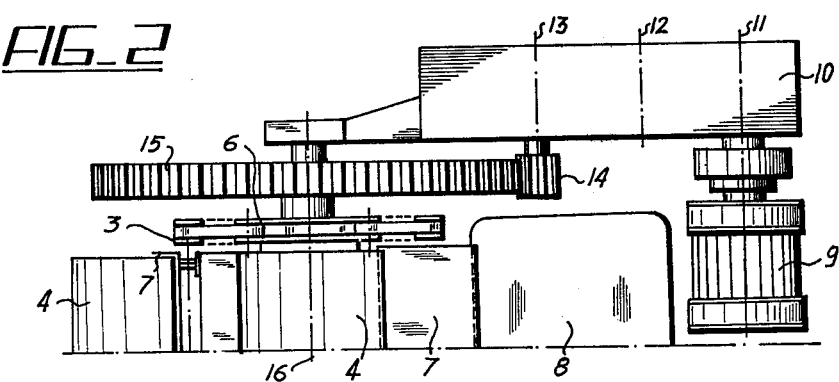
FIG_2

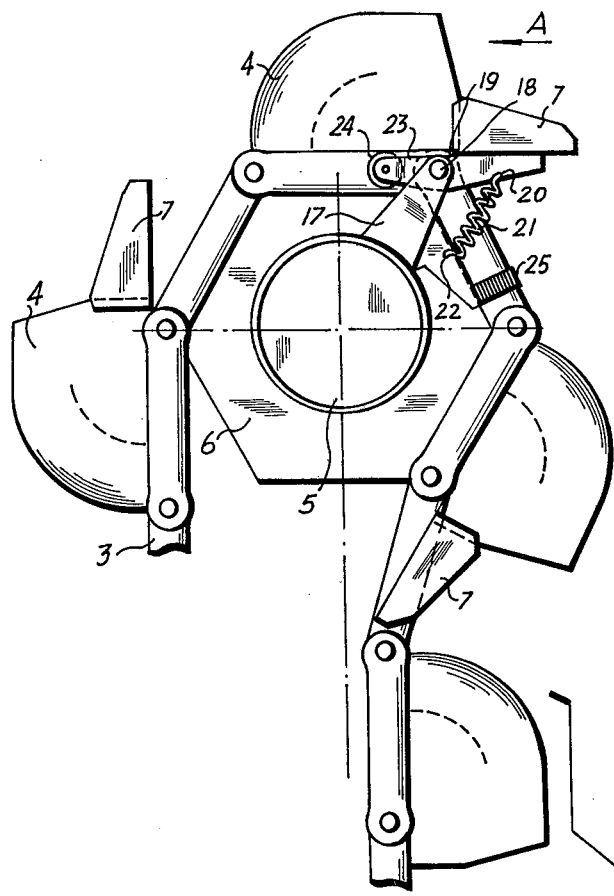
FIG_3
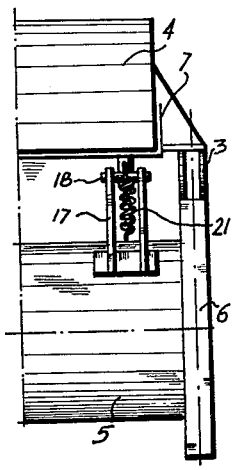
FIG_5
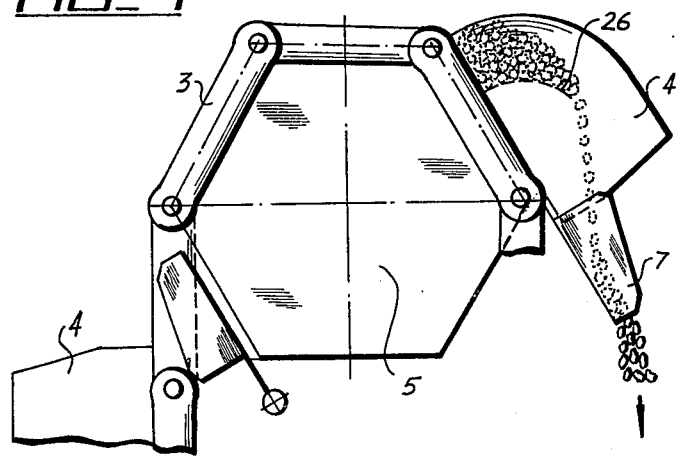
FIG_4

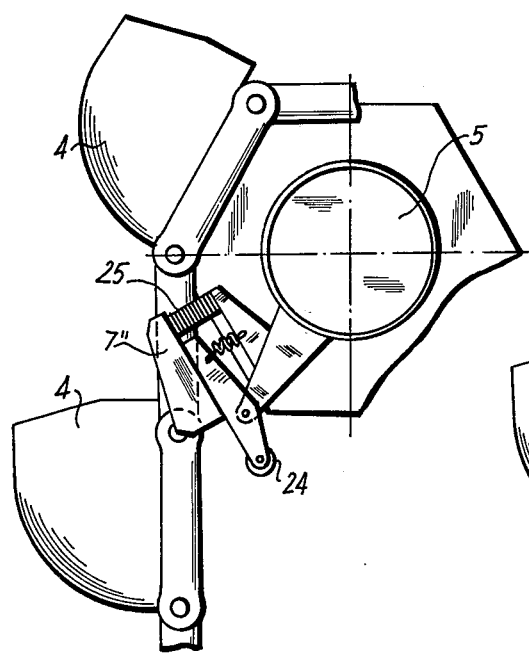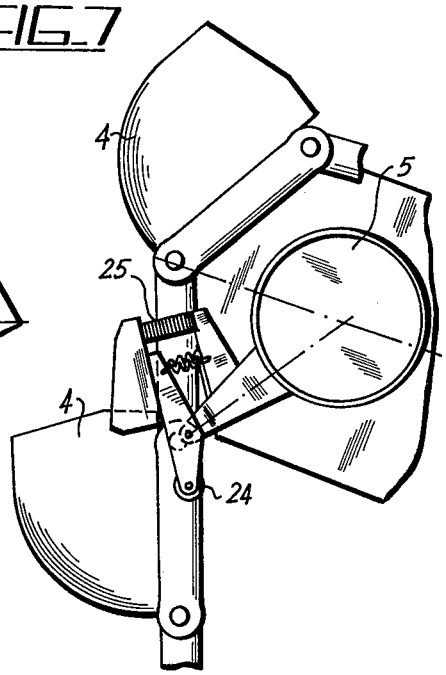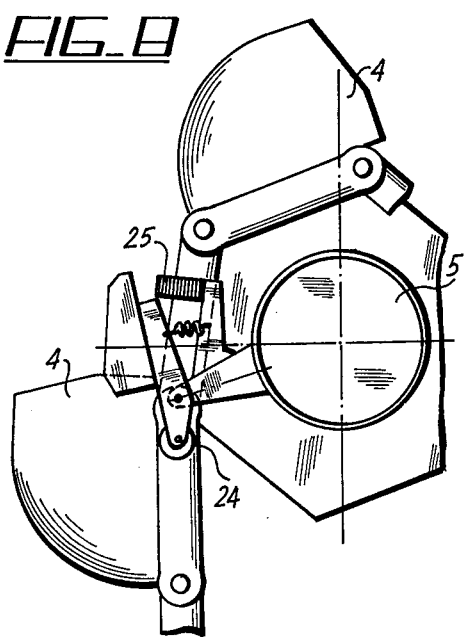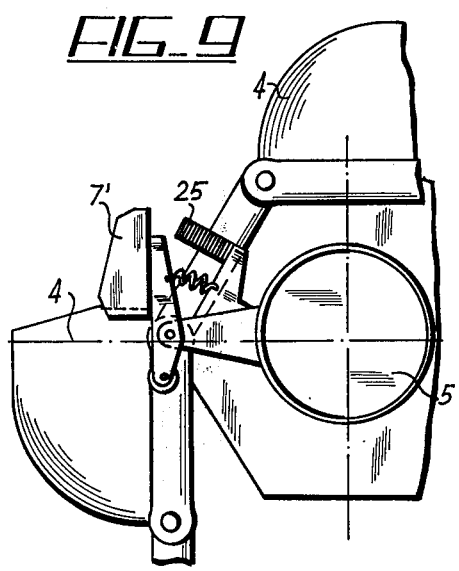

APPARATUS FOR TRANSPORTING BULK MATERIALS

BACKGROUND OF THE INVENTION

The invention relates to an apparatus for transporting bulk materials, more particularly for discharging ships, having an endless series of buckets which are fixed to spaced links of a chain device movable in circulation which is guided over return pulleys, whilst the buckets are adapted to be emptied by a discharge chute when passing over a top return pulley.

Apparatuses of this kind are used e.g., in known bucket chain dredgers. Here the spacing interval of the buckets is generally four to six chain divisions, and is therefore relatively long. The long bucket spacing interval produces favourable conditions for the emptying process, because the emptying of the bucket which is just passing the top return pulley is not obstructed by the preceding bucket which has already been emptied.

In ship discharge installations the transport capacity of such apparatus having buckets fixed to a circulating chain device is frequently insufficient and the buckets therefore have to be arranged at shorter intervals. However, a shorter interval creates difficulties in the emptying process, because bulk material running out of the bucket which is just tipping falls onto the back of the preceding bucket. This causes the bulk material to be scattered in an uncontrollable manner so that it cannot be caught completely—e.g. by a chute and a conveyor belt.

In known apparatus for discharging ships, having buckets fixed to a circulating chain device, such as are described e.g. in DL-PS No. 6,656, in DT-PS No. 2,109,213 or in DT-OS No. 2,334,976, this problem is not solved or is solved only in a rather complicated manner. The spillage of bulk material cannot be prevented and a statically unfavourable oblique position of the chain device and/or a complicated guidance of the chain device in its upper region with generously dimensioned catching and/or conveyor devices is necessary to catch and further transmit the scattering bulk material.

A further disadvantage of known apparatus having buckets fixed to circulating chain devices is the discontinuous discharge of the bulk material from the consecutively tipping buckets.

The underlying object of this invention is to produce an apparatus which minimises or eliminates the above mentioned disadvantages and achieves a more controlled emptying of the buckets tipping at a top return pulley.

SUMMARY

In an apparatus of the kind initially defined, this aim is achieved in that the discharge chutes are pivotally articulated to the top return pulley at intervals corresponding to the spacing of the buckets.

Each discharge chute in this arrangement is preferably pivotable between a neutral position approximately tangential to the return roller and a working position approximately parallel to the following link of the conveying or chain device, bearing against the respective oncoming bucket.

The pivotal axis of the discharge chutes is advantageously arranged in the region of their rear bottom edge. This pivotal mounting of the discharge chutes on the top return pulley permits the shock-free and gapless "slipping-in" of the discharge chutes between the individual buckets which travel around the top return pulley on the chain device. It is even possible, if desired, to construct the discharge chutes with a length which is only slightly shorter than the bucket spacing interval, without the discharge chutes being obstructed during the pivoting.

The discharge chutes are advantageously tensioned in the direction of the neutral position by a return device, e.g. a spring, and are pivotable into the operative position counter to the force of the return device by the respective oncoming bucket by means of a control lever.

A shock-absorbing element is conveniently arranged on the top return pulley and/or on the discharge chute.

Instead of the return device constructed, e.g. as a spring, a hoisting-traction device, e.g. a pistoncylinder unit, articulated to the discharge chute may be provided for the pivoting of the latter.

The emptying process which occurs through the discharge chutes arranged according to the invention can furthermore be equalised in that the buckets are subdivided by at least one partition wall which is inclined with respect to the transport or chain direction so that the respective bucket passing the top return pulley can be emptied initially through the discharge chute and then through the partition wall and the discharge chute.

BRIEF DESCRIPTION OF THE DRAWINGS

The drawings illustrate an apparatus for picking up and transporting bulk materials which is suitable for discharging a ship, and:

FIG. 1 shows the top part of the apparatus in side elevation,

FIG. 2 shows a plan of the apparatus according to FIG. 1,

FIG. 3 shows a detail of the apparatus in an elevation corresponding to FIG. 1,

FIG. 4 shows a detail of the apparatus analogously to FIG. 3, but in a next phase of the emptying process, FIG. 5 shows an elevation of the detail according to FIG. 3 in the direction of the arrow A, FIGS. 6 to 9 show the function of the detail according to FIGS. 3–5 in different phases in elevations analogous to FIGS. 1, 3 and 4.

DESCRIPTION OF THE PREFERRED EMBODIMENT

FIG. 1 illustrates a general view of the top part of an apparatus for picking up and transporting bulk materials according to the invention having the features important to the emptying process. The bottom section of the apparatus, which is not shown in the drawing, is not essential to the invention and may be equipped with one or more return pulleys in customary manner.

The apparatus according to the invention is generally designated 1 and is suspended in the embodiment illustrated from a beam 2 which is arranged for raising, lowering, transverse and longitudinal movement, rotation and pivoting, on a jib of a ship discharge installation (not shown). The entire apparatus can be lowered into the hold of a ship at any desired point and in any desired oblique and rotary position. The bottom section of the apparatus 1, not shown in the drawing, enters the bulk material and buckets 4 fixed to a chain device 3 pick up the bulk material and transport it into the upper section illustrated in FIG. 1.

The chain device 3 comprises two individual endless chains which are arranged on both sides of the buckets 4. A bucket 4 is fixed to each second chain link. A top return pulley is generally designated 5. It exhibits for each of the two chains a chain wheel 6 which has approximately the shape of a hexagon.

Three discharge chutes 7 are articulated to the return pulley 5 in conformity with the spacing interval of the buckets 4, as may be seen in detail more particularly from FIGS. 3 and 5 explained hereinbelow. In the rotary position of the return pulley 5 illustrated in FIG. 1, the discharge chutes 7 all occupy a position approximately parallel to the transport or chain direction - i.e. parallel to the position of the individual chain link to which the respective bucket 4 co-operating with the respective chute 7 is fixed. This position is the operative position 7' of the discharge chutes 7 (cp. FIG. 9).

In FIG. 1, 8 designates a chute 8 integral with the beam 2. The bulk material running out of the tipping buckets 4 as they pass the return pulley 5 falls into said chute 8 and a further transport device, not shown, is arranged below the chute 8 and conveys the bulk material through a transport system, likewise not shown, to the required storage point.

A motor is designated 9 and a gearbox 10, which drives the top return pulley 5 and hence the entire chain device 3 with the buckets 4.

This drive system may be seen in greater detail from FIG. 2. The shafts 11, 12, 13 of the gearbox 10 are indicated, whilst a pinion 14 is mounted on the output shaft 13 of the gearbox and meshes with a large gear 15. The gear 15 is mounted fixed on the shaft 16 of the top return pulley 5 and drives the latter.

The articulate mode of fixing the discharge chutes 7 to the return pulley 5 and the pivoting mechanism for the chutes 7 is visible in greater detail from FIGS. 3 and 5. The chutes 7 are articulated to an arm 17 of the return pulley 5, while the pivotal axis 18 is located in the region of the rear bottom edge 19 of the chutes 7. Each discharge chute 7 is attached at 20 to a spring 21, the other end 22 of which is fixed to the return pulley 5. The spring 21 tensions the chute 7 towards a neutral position, which is however not occupied by any of the three discharge chutes 7 in FIG. 3.

A control lever 23 which carries a control wheel 24 at its end is integral with each discharge chute 7. The control wheel 24 is in abutment with the bucket 4 in the operative position of the latter, as may be seen clearly in the case of the top bucket in FIG. 3. (In the case of the other buckets 4 visible in FIG. 3 this mechanism has been omitted for the sake of greater clarity).

As the functional illustration of FIGS. 6 to 9 shows, (the arrow in FIG. 6 shows the direction of rotation), the chute 7 occupying the neutral position 7" (FIG. 6) travels between the two buckets 4 on the entry side of the return pulley 5 and remains in the neutral position 7" until the control wheel 24 enters into abutment with the bucket 4 arriving beneath (FIG. 7). The chute 7 then pivots progressively inwards towards the operative position under the pressure of the control wheel 24 (FIG. 8), which operative position 7' is attained in the position illustrated in FIG. 9.

When the bucket 4 which has just travelled round the return pulley 5 leaves the latter and the control wheel 24 is released by the bucket, the spring 21 pulls the discharge chute 7 back into the neutral position. In order that no abrupt impact then occurs, shock-absorbing elements 25 are present on the top return pulley 5.

Lastly, it will be clear more particularly from FIG. 4 that each bucket 4 is subdivided by a partition wall 26, the contour of which is curved and in fact extends parallel to the outer wall of the bucket. The bucket 4 shown on the right-hand side in FIG. 4 occupies a position in which its space located between the partition wall 26 and its outer wall is just beginning to empty across the wall 26, after the space present between the partition wall 26 and the inner bucket wall has already been emptied through the chute 7. The equalisation of the emptying process achieved by the partition wall 26 is clear.

Another return device may obviously be used instead of the traction spring 21, e.g. one with a permanent application of weight or one with a torsion bar.

Although the apparatus according to the invention is used preferably as an apparatus for picking up and transporting bulk materials out of a ship's hold, nevertheless its use as a pure vertical or oblique conveyor for a wide variety or purposes is likewise possible.

I claim:

1. An apparatus for transporting bulk materials, comprising an endless series of buckets fixed to spaced links of a chain device adapted for circulatory movement and guided over an upper return pulley, the buckets being adapted to be emptied as they pass over the upper return pulley, characterised in that discharge chutes are pivotally articulated to the upper return pulley at intervals corresponding to the spacing of the buckets.

2. An apparatus according to claim 1, characterised in that each discharge chute is pivotable between a neutral position in which it is disposed approximately tangential to the upper return pulley and a working position in which it is disposed approximately parallel to the following link of the chain device, bearing against the respective oncoming bucket.

3. An apparatus according to claim 1, characterised in that the pivotal axis of each discharge chute is disposed in the region of its rear bottom edge.

4. An apparatus according to claim 2, characterised in that the discharge chutes are tensioned in the direction of the neutral position by a return device such as a spring, and are pivotable into the operative position counter to the force of the return device by the respective oncoming bucket by means of a control lever.

5. An apparatus according to claim 4, characterised in that a shock-absorbing element is arranged on the upper return pulley and/or on the discharge chute.

6. An apparatus according to claim 1, characterised in that each discharge chute is pivotable by means of a hoisting-traction device, such as a piston-cylinder unit, articulated thereto.

7. Apparatus according to claim 1, characterised in that the buckets are each subdivided by at least one partition wall which is inclined with respect to the transport or chain direction so that the respective bucket passing the upper return pulley is adapted to be emptied firstly over the discharge chute and then over the partition wall and the discharge chute.

8. An apparatus according to claim 1, characterized in that each discharge chute is pivotable between a neutral position and a working position in which it is disposed approximately parallel to the following link of the chain device, bearing against the respective oncoming bucket, and in that the apparatus comprises means for pivoting each discharge chute between the neutral position and the working position.

* * * * *